United States Patent Office 2,874,171
Patented Feb. 17, 1959

2,874,171

RECOVERY OF ERGOSTEROL

Harrison A. Nelson, Kalamazoo Township, Kalamazoo County, Mich., assignor to The Upjohn Company, Kalamazoo, Mich., a corporation of Michigan No Drawing. Application February 20, 1957
Serial No. 641,241

7 Claims. (Cl. 260—397.25)

The present invention relates to a novel process for the recovery of ergosterol from yeast and more especially to an improved process for the recovery of ergosterol from yeast by heating a mixture of an aqueous yeast slurry, an alkali, and a partially water-miscible alkanol.

Ergosterol can readily be converted to vitamin D by ultraviolet irradiation according to processes well known in the art.

In the present process ergosterol is extracted from yeast in excellent yields and a high degree of purity. The ergosterol is released from the fatty material of the yeast in one step and is recovered from the resulting mixture by simple manipulative techniques.

Ergosterol has been recovered from yeast by heating yeast with an alkali in order to rupture the yeast cells and to saponify the ergosterol-containing fatty material. The ergosterol is subsequently recovered from the resulting gummy mass by extracting with a preferred solvent, e. g., ethanol. In order to obtain the highest possible yield of ergosterol the yeast residue is cooked two or three times with an alkali and each time extracted with a preferred solvent, e. g., ethanol. Another process for the extraction of ergosterol involves heating yeast cells and a methanolic solution of caustic alkali, filtering the resulting gummy mass to effect removal of the yeast residue, and cooling the filtrate in order to precipitate the ergosterol. Unfortunately, on cooling the filtrate some of the water soluble soaps along with other impurities are also precipitated which necessitates additional purification of the precipitate. Moreover, in order to obtain a creditable yield of ergosterol the yeast residue is recooked two or three times thus necessitating additional manipulative steps.

Still another procedure for the recovery of ergosterol from yeast cells utilizes sulfuric acid to rupture the yeast cell walls. The resulting mixture is then filtered, and the solid residue is treated with a partially water-miscible solvent, e. g., butanol. The mixture is distilled until a binary mixture of solvent and water is removed, the remaining hot solvent extract is filtered from the residue, the solvent extract is saponified with an alkali, and ergosterol is recovered from the solvent layer. The patent process possesses the essential disadvantage of requiring at least five steps prior to the important saponification step wherein the ergosterol is actually released from the fatty material.

In the process of the present invention the steps of rupturing the yeast cells, saponifying the fatty material to release the ergosterol, and separating the ergosterol from the water soluble soaps is accomplished simply in one step in contrast to the multi-step processes of the prior art. Moreover, in the present process excellent yields of ergosterol are obtained in simply one cooking of the yeast in contrast to the two or three cookings required by the prior art.

In carrying out the process of the present invention an aqueous slurry of ergosterol-containing yeast is heated under pressure, preferably with agitation, with a partially water miscible alkanol and an alkali to a temperature between about 100 and about 150 degrees centigrade for a period between about ten minutes and about one hour, preferably about 120 degrees centigrade for about thirty minutes. An aqueous yeast slurry containing about five to about thirty percent yeast, preferably about fifteen percent, is generally employed. The heating is preferably carried out in an autoclave accompanied by agitation. Partially water miscible alkanols which can be employed include the aliphatic alcohols having from four to eight carbon atoms such as n-butanol, isobutanol, 1-pentanol, 1-hexanol, 1-heptanol, and 1-octanol, with n-butanol being preferred. Suitable alkanol concentrations include between about two and about ten milliliters per gram of dry yeast preferably three to five milliliters per gram of dry yeast. Saponifying alkalis which can be employed include potassium and sodium hydroxide, and the like, and can be employed in a concentration between about three and about twenty percent of the water content present in the slurry, preferably between five and ten percent.

The released ergosterol can be recovered from the reaction mixture by cooling the mixture to below the boiling point of the resulting mixture and filtering. The aqueous phase of the filtrate is discarded and the alkanol phase is concentrated under vacuum to a thick syrup. To the thick syrup is added sufficient water, heated to approximately ninety degrees centigrade, until a clear solution is obtained which is then chilled to between about zero and about ten degrees centigrade to crystallize the ergosterol which is recovered by filtration.

The following examples are illustrative of the process of the present invention, but are not to be construed as limiting.

Example I

To 160 milliliters of an aqueous yeast slurry containing thirty grams of yeast (dry weight) was added 100 milliliters of normal butanol and ten grams of solid sodium hydroxide. The theoretical content of ergosterol in the yeast was 2.84 grams as determined by measuring the ultraviolet absorption of a chloroform extract of hydrolyzed cells. The mixture was autoclaved with agitation at 120 degrees centigrade for thirty minutes, and after cooling to between forty degrees and sixty degrees centigrade, ten grams of filter aid was added, and the resulting mixture was filtered. The butanol phase of the filtrate was separated by gravity. The filter cake was twice extracted by stirring with butanol at 95 degrees centigrade. The butanol fractions were combined and concentrated under vacuum to forty milliliters of thick syrup. About 25 milliliters of water heated to ninety degrees centigrade was added to the syrup until a clear solution was produced. The clear butanol water solution was chilled to three degrees centigrade and the resulting crystals were removed by filtration. The recovered crystals weighed 2.57 grams and assayed 91.7 percent pure thus containing 2.35 grams of ergosterol, a recovery of 82.8 percent.

Example II

To 200 milliliters of an aqueous yeast slurry containing 35.6 grams of yeast (dry weight) was added 150 milliliters of normal butanol and ten grams of solid sodium hydroxide. The theoretical quantity of ergosterol in the yeast was 0.580 gram as determined by measuring the ultraviolet absorption of a chloroform extract of hydrolyzed cells. The mixture was heated in a sealed container under agitation and pressure at 121 degrees centigrade for thirty minutes. The reaction mixture was cooled to below the boiling point before opening the container, ten grams of filter aid (diatomaceous earth)

was added and the mixture was filtered and the butanol phase of the filtrate was separated by gravity. The filter cake was stirred twice with 100 milliliters of normal butanol at 95 degrees centigrade for ten minutes and filtered. The butanol fractions were combined and concentrated under vacuum until the distillation temperature reached 104 degrees centigrade. About eighty milliliters of water heated to 95 degrees centigrade was added to form a clear solution. The clear solution was cooled to about three degrees centigrade and maintained at this temperature for about ten hours. The crystals were recovered by filtration and washed with water cooled to about three degrees centigrade. The recovered crystals weighed 0.663 gram and assayed 82.2 percent pure thus containing 0.545 gram of ergosterol, a recovery of 94 percent.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the recovery of ergosterol from yeast which comprises the steps of heating a mixture of an aqueous yeast slurry, an alkali metal hydroxide, and a partially water miscible alkanol containing from four to eight carbon atoms at a temperature between about 100 and about 150 degrees centigrade whereby the yeast cells are ruptured and the ergosterol containing fatty material is saponified to release the ergosterol, and recovering ergosterol from the partially water miscible alkanol.

2. A process for the recovery of ergosterol from yeast which comprises the steps of heating a mixture of an aqueous yeast slurry, an alkali metal hydroxide, and a partially water miscible alkanol containing from four to eight carbon atoms at a temperature of about 120 degrees centigrade for about thirty minutes whereby the yeast cells are ruptured and the ergosterol containing fatty material is saponified to release the ergosterol, and recovering ergosterol from the partially water miscible alkanol.

3. A process for the recovery of ergosterol from yeast which comprises the steps of autoclaving a mixture of an aqueous yeast slurry, sodium hydroxide, and normal butanol at a temperature of about 120 degrees centigrade for about thirty minutes whereby the yeast cells are ruptured and the ergosterol containing fatty material is saponified to release the ergosterol, and recovering ergosterol from the normal butanol.

4. A process for the recovery of ergosterol from yeast which comprises the steps of autoclaving a mixture of an aqueous yeast slurry, an alkali metal hydroxide, and a partially water miscible alkanol containing from four to eight carbon atoms at a temperature of between about 100 and about 150 degrees centigrade whereby the yeast cells are ruptured and the ergosterol containing fatty material is saponified to release the ergosterol, cooling the reaction mixture, filtering, and recovering ergosterol from the alkanol phase.

5. A process for the recovery of ergosterol from yeast which comprises the steps of autoclaving a mixture of an aqueous yeast slurry, an alkali metal hydroxide, and a partially water miscible alkanol containing from four to eight carbon atoms at a temperature of about 120 degrees centigrade for about thirty minutes whereby the yeast cells are ruptured and the ergosterol containing fatty material is saponified to release the ergosterol, cooling the reaction mixture, filtering, and recovering ergosterol from the alkanol phase.

6. A process for the recovery of ergosterol from yeast which comprises the steps of autoclaving a mixture of an aqueous yeast slurry, sodium hydroxide, and normal butanol at a temperature of about 120 degrees centigrade for about thirty minutes whereby the yeast cells are ruptured and the ergosterol containing fatty material is saponified to release the ergosterol, cooling the reaction mixture, filtering, and recovering ergosterol from the normal butanol phase.

7. A process for the recovery of ergosterol from yeast which comprises the steps of autoclaving a mixture of an aqueous yeast slurry, an alkali metal hydroxide, and a partially water miscible alkanol containing from four to eight carbon atoms at a temperature of about 100 to about 150 degrees centigrade whereby the yeast cells are ruptured and the ergosterol containing fatty material is saponified to release the ergosterol, cooling the reaction mixture, filtering, concentrating the alkanol phase, adding water to the concentrate, chilling the mixture to between zero and about ten degrees centigrade, and recovering ergosterol from the chilled mixture.

References Cited in the file of this patent

UNITED STATES PATENTS

| | | |
|---|---|---|
| 2,355,661 | Light et al. | Aug. 15, 1944 |
| 2,730,536 | Feeney | Jan. 10, 1956 |